(12) United States Patent
Tanaka

(10) Patent No.: US 8,692,427 B2
(45) Date of Patent: Apr. 8, 2014

(54) AUTOMOTIVE ALTERNATOR RECTIFYING APPARATUS

(75) Inventor: Kazunori Tanaka, Chiyoda-ku (JP)

(73) Assignee: Mitsubishi Electric Corp., Tokyo (JP)

( * ) Notice: Subject to any disclaimer, the term of this patent is extended or adjusted under 35 U.S.C. 154(b) by 420 days.

(21) Appl. No.: 13/086,776

(22) Filed: Apr. 14, 2011

(65) Prior Publication Data
US 2012/0126638 A1    May 24, 2012

(30) Foreign Application Priority Data
Nov. 19, 2010    (JP) .................. 2010-258665

(51) Int. Cl.
*H02K 11/04*    (2006.01)

(52) U.S. Cl.
USPC .......................... 310/68 D; 310/43

(58) Field of Classification Search
USPC .................................. 310/43, 68 D
See application file for complete search history.

(56) References Cited

U.S. PATENT DOCUMENTS

| | | | |
|---|---|---|---|
| 5,043,614 A * | 8/1991 | Yockey ..................... | 310/68 D |
| 5,737,210 A * | 4/1998 | Barahia .................... | 363/144 |
| 6,081,054 A * | 6/2000 | Kashihara et al. .......... | 310/68 D |
| 6,114,783 A * | 9/2000 | Asao ........................ | 310/58 |
| 6,150,196 A * | 11/2000 | Tanaka et al. ............. | 438/122 |
| 6,285,100 B1 * | 9/2001 | Pflueger et al. .......... | 310/68 D |
| 6,552,908 B2 * | 4/2003 | DeNardis .................. | 361/709 |
| 6,661,662 B2 * | 12/2003 | DeNardis .................. | 361/709 |
| 7,612,474 B2 * | 11/2009 | DePetris et al. .......... | 310/68 D |
| 7,741,742 B2 * | 6/2010 | Imazawa et al. .......... | 310/68 D |

FOREIGN PATENT DOCUMENTS

| | | |
|---|---|---|
| JP | 06070427 A | 3/1994 |
| JP | 6-267608 A | 9/1994 |
| JP | 10-326662 A | 8/1998 |
| JP | 2000-286002 A | 10/2000 |
| JP | 2001197627 A | 7/2001 |
| JP | 2001286035 A | 10/2001 |
| JP | 2002034120 A | 1/2002 |
| JP | 2004-357451 A | 12/2004 |
| JP | 2007-009790 A | 1/2007 |
| JP | 2008-186706 A | 8/2008 |
| JP | 2010-011601 A | 1/2010 |
| WO | 2006/033136 A1 | 3/2006 |

OTHER PUBLICATIONS

Japanese Office Action dated Oct. 16, 2012, issued in corresponding Japanese Patent Application No. 2010-258665.
Japanese Office Action dated Apr. 2, 2013, issued in corresponding Japanese Patent Application No. 2010-258665.

* cited by examiner

*Primary Examiner* — Tran Nguyen
(74) *Attorney, Agent, or Firm* — Sughrue Mion, PLLC

(57) ABSTRACT

The circuit board includes: a first resin-molded body; a second resin-molded body; and a plurality of terminals each including: a positive electrode terminal portion to which is connected a lead of the positive-side rectifying element to be connected thereto; a negative electrode terminal portion to which is connected a lead of the negative-side rectifying element to be connected thereto; and a trunk portion that links the positive electrode terminal portion and the negative electrode terminal portion. The plurality of terminals are each held between the first resin-molded body and the second resin-molded body so as to be separated from each other such that the trunk portion is disposed between mating surfaces of the first resin-molded body and the second resin-molded body, the positive electrode terminal portion is inserted through the second resin-molded body, and the negative electrode terminal portion is inserted through the first resin-molded body.

14 Claims, 12 Drawing Sheets

AUTOMOTIVE ALTERNATOR RECTIFYING APPARATUS

BACKGROUND OF THE INVENTION

1. Field of the Invention

The present invention relates to an automotive alternator rectifying apparatus that is driven by a vehicle engine to generate electric power, and particularly relates to construction of a circuit board that constitutes the rectifying apparatus.

2. Description of the Related Art

Conventional automotive alternator rectifying apparatuses include: a positive-side heatsink to which positive-side rectifying elements are mounted; a negative-side heatsink to which negative-side rectifying elements are mounted; and a circuit board that connects the positive-side rectifying elements and the negative-side rectifying elements so as to configure a bridge circuit (see Patent Literature 1, for example).

[Patent Literature 1]

International Publication No. WO/2006/033136 (Pamphlet)

In conventional automotive alternator rectifying apparatuses, the circuit board is a resin-molded body that is formed into a horseshoe shape, for example, and a plurality of terminals that connect the positive-side rectifying elements and the negative-side rectifying elements so as to configure a bridge circuit are insert-molded.

However, because the terminals each have a complex shape that includes bend portions at a plurality of positions, when insert-molding, it is necessary to set the terminals in the mold so as to be positioned at predetermined positions while ensuring desired postures, and there are also many mold seals, and one problem has been that moldability has been poor.

SUMMARY OF THE INVENTION

The present invention aims to solve the above problems and an object of the present invention is to provide an inexpensive automotive alternator rectifying apparatus in which a circuit board is configured using first and second resin-molded bodies that have been divided into front and rear portions to hold terminals from opposite sides to improve circuit board moldability.

In order to achieve the above object, according to one aspect of the present invention, there is provided an automotive alternator rectifying apparatus including: a positive-side heatsink to which a plurality of positive-side rectifying elements are mounted; a negative-side heatsink that is disposed so as to be separated from the positive-side heatsink, and to which a plurality of negative-side rectifying elements are mounted; and a circuit board that is disposed between the positive-side heatsink and the negative-side heatsink, and that connects the plurality of positive-side rectifying elements and the plurality of negative-side rectifying elements to configure a bridge circuit. The circuit board includes: an electrically insulating first resin-molded body; an electrically insulating second resin-molded body that is stacked together with the first resin-molded body and integrated with the first resin-molded body; and a plurality of terminals each including: a positive electrode terminal portion to which is connected a lead of the positive-side rectifying element to be connected thereto; a negative electrode terminal portion to which is connected a lead of the negative-side rectifying element to be connected thereto; and a trunk portion that links the positive electrode terminal portion and the negative electrode terminal portion. The plurality of terminals are each held between the first resin-molded body and the second resin-molded body so as to be separated from each other such that the trunk portion is disposed between mating surfaces of the first resin-molded body and the second resin-molded body, the positive electrode terminal portion is inserted through the second resin-molded body, and the negative electrode terminal portion is inserted through either the first resin-molded body or the second resin-molded body.

According to the present invention, because a plurality of terminals are held between a first resin-molded body and a second resin-molded body such that a trunk portion is disposed between mating surfaces of the first resin-molded body and the second resin-molded body, it is not necessary to insert-mold the terminals into the first resin-molded body and the second resin-molded body. Thus, when the first resin-molded body and the second resin-molded body are being molded, it is not necessary to set the terminals in a mold so as to be positioned at predetermined positions while ensuring desired postures, and mold sealing positions are also reduced. Thus, moldability of the first resin-molded body and the second resin-molded body is improved significantly and yield is also increased, enabling costs to be reduced.

DETAILED DESCRIPTION OF THE PREFERRED EMBODIMENTS

Preferred embodiments of an automotive alternator rectifying apparatus according to the present invention will now be explained with reference to the drawings.

Embodiment 1

Figure 1:
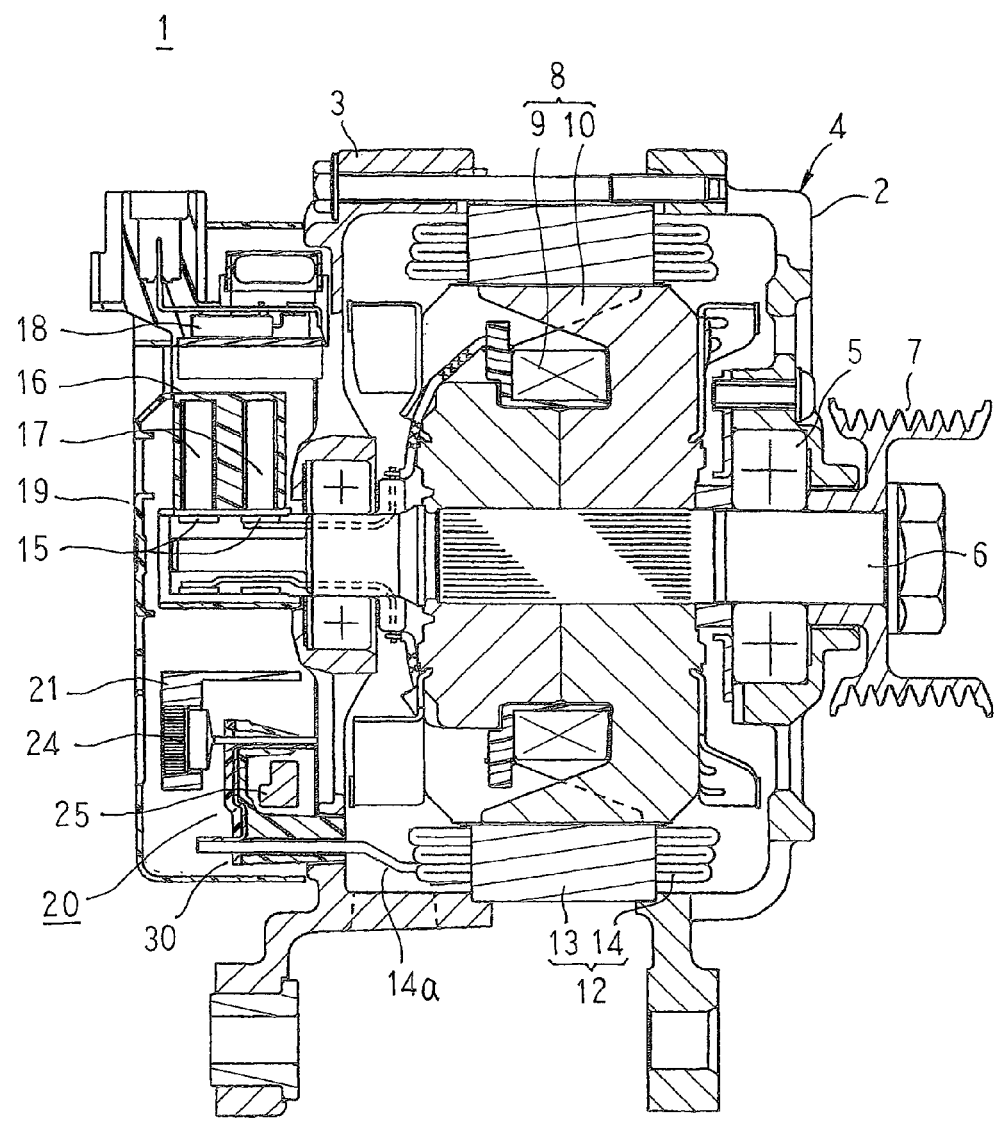
FIG. 1 is a longitudinal cross section that shows an automotive alternator according to Embodiment 1 of the present invention.
Figure 2:
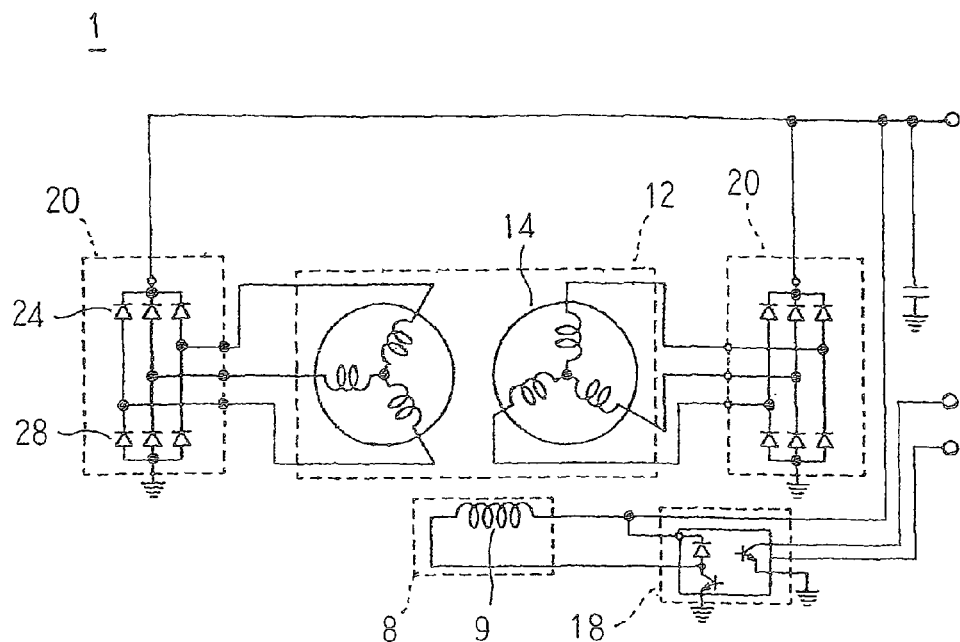
FIG. 2 is a circuit configuration diagram for the automotive alternator according to Embodiment 1 of the present invention.
Figure 3:
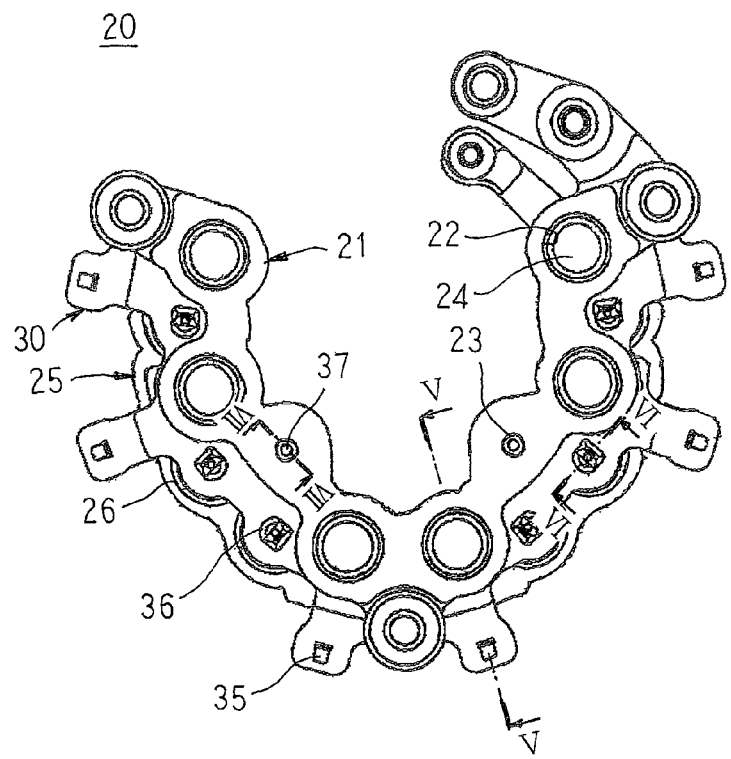
FIG. 3 is a front elevation that shows an automotive alternator rectifying apparatus according to Embodiment 1 of the present invention.
Figure 4:
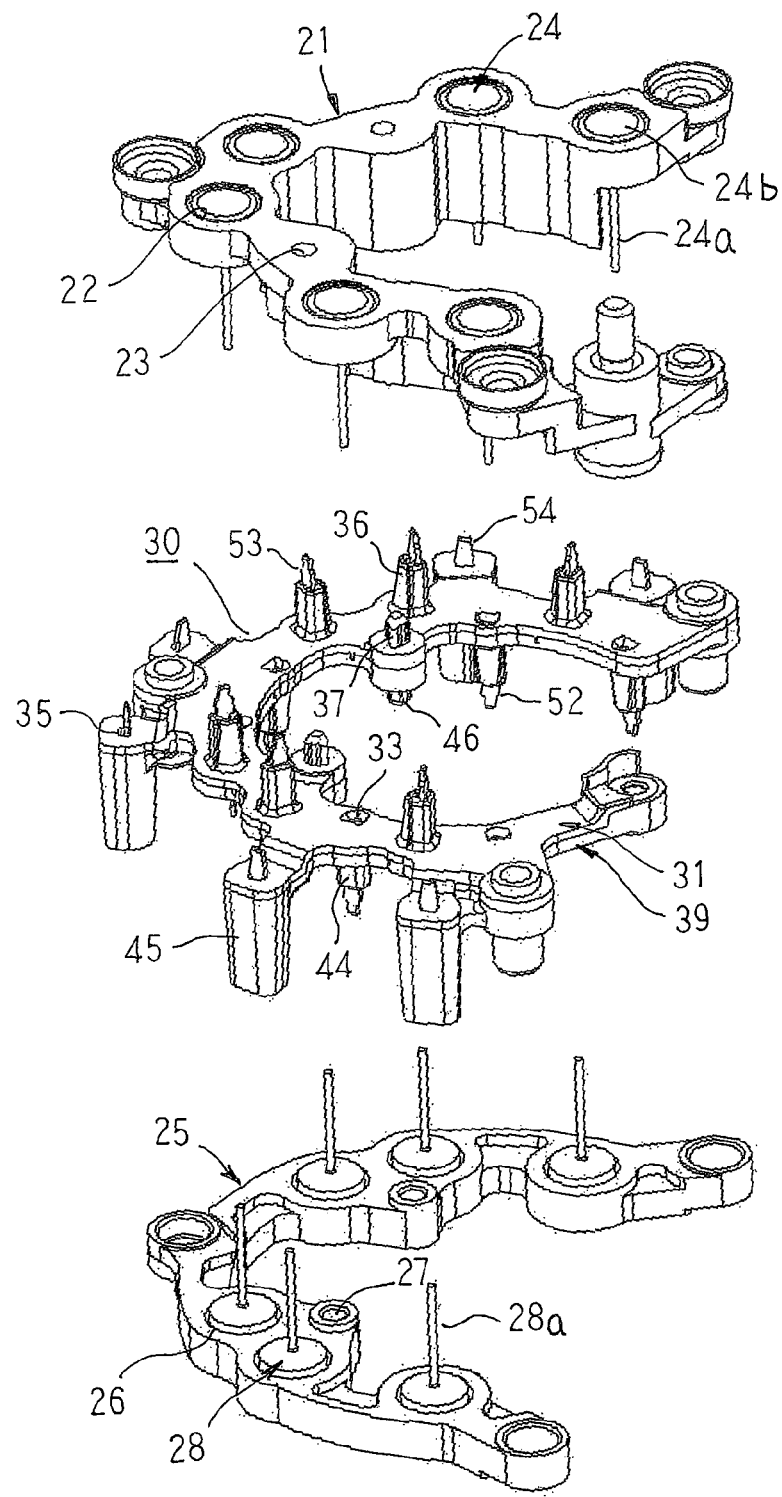
FIG. 4 is an exploded perspective that shows the automotive alternator rectifying apparatus according to Embodiment 1 of the present invention.
Figure 5:
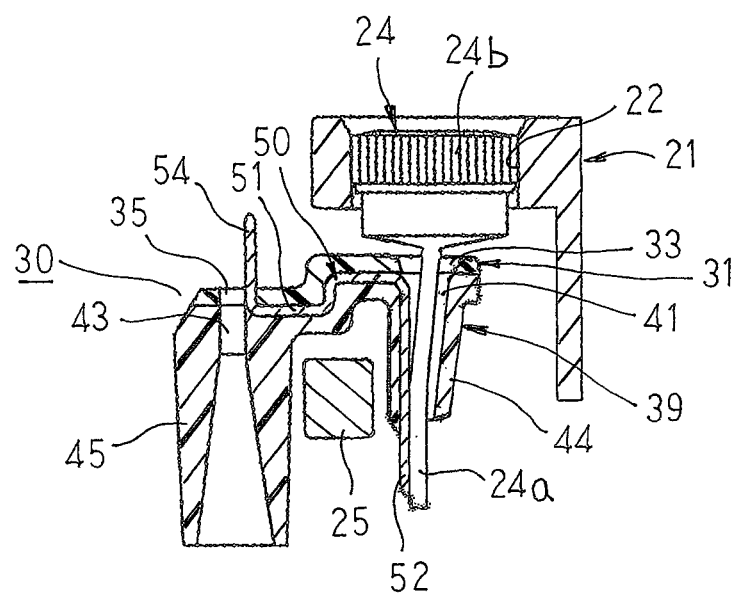
FIG. 5 is a cross section that is taken along Line V-V in FIG. 3 so as to be viewed in the direction of the arrows.
Figure 6:
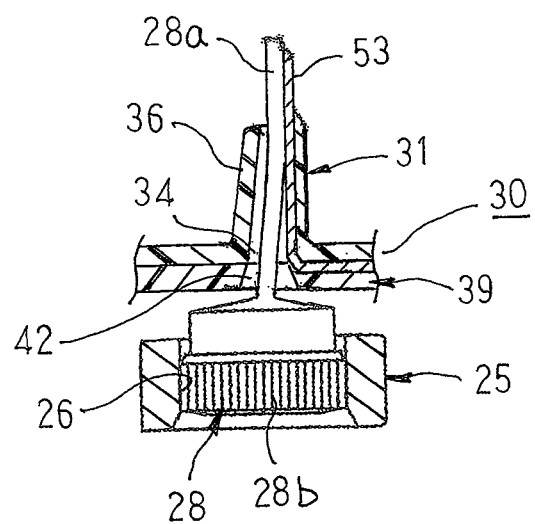
FIG. 6 is a cross section that is taken along Line VI-VI in FIG. 3 so as to be viewed in the direction of the arrows.
Figure 7:
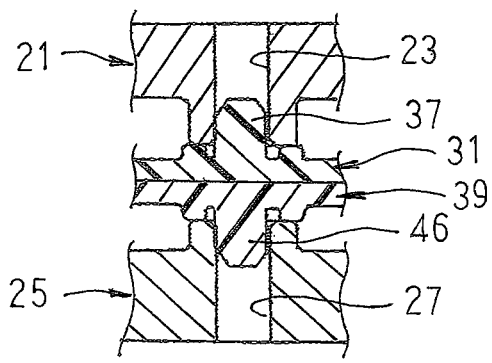
FIG. 7 is a cross section that is taken along Line VII-VII in FIG. 3 so as to be viewed in the direction of the arrows.
Figure 8:
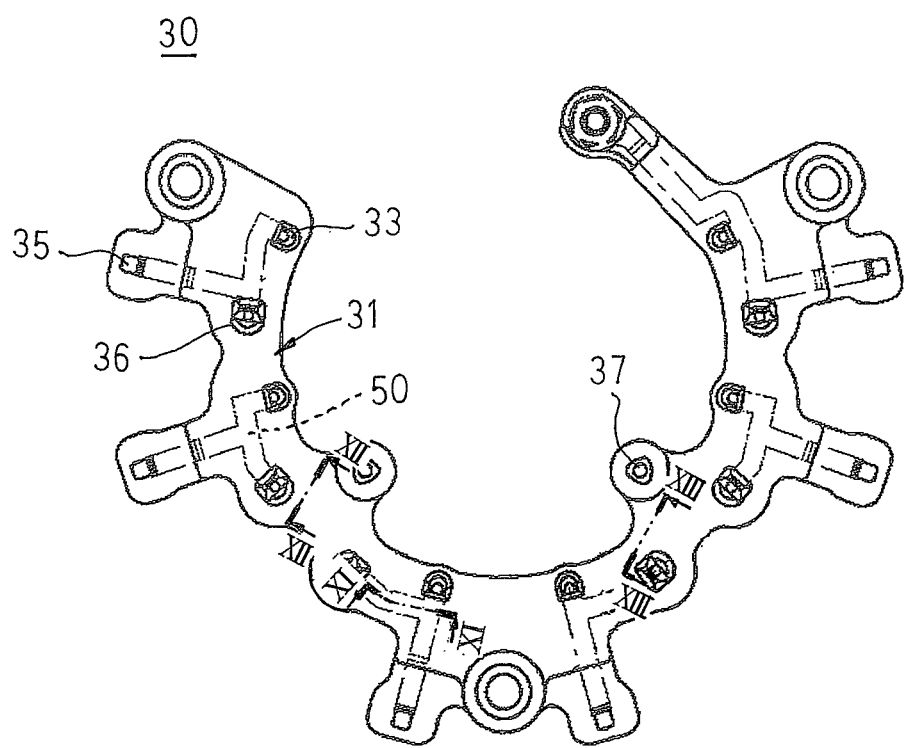
FIG. 8 is a front elevation that shows a circuit board that constitutes the automotive alternator rectifying apparatus according to Embodiment 1 of the present invention.
Figure 9:
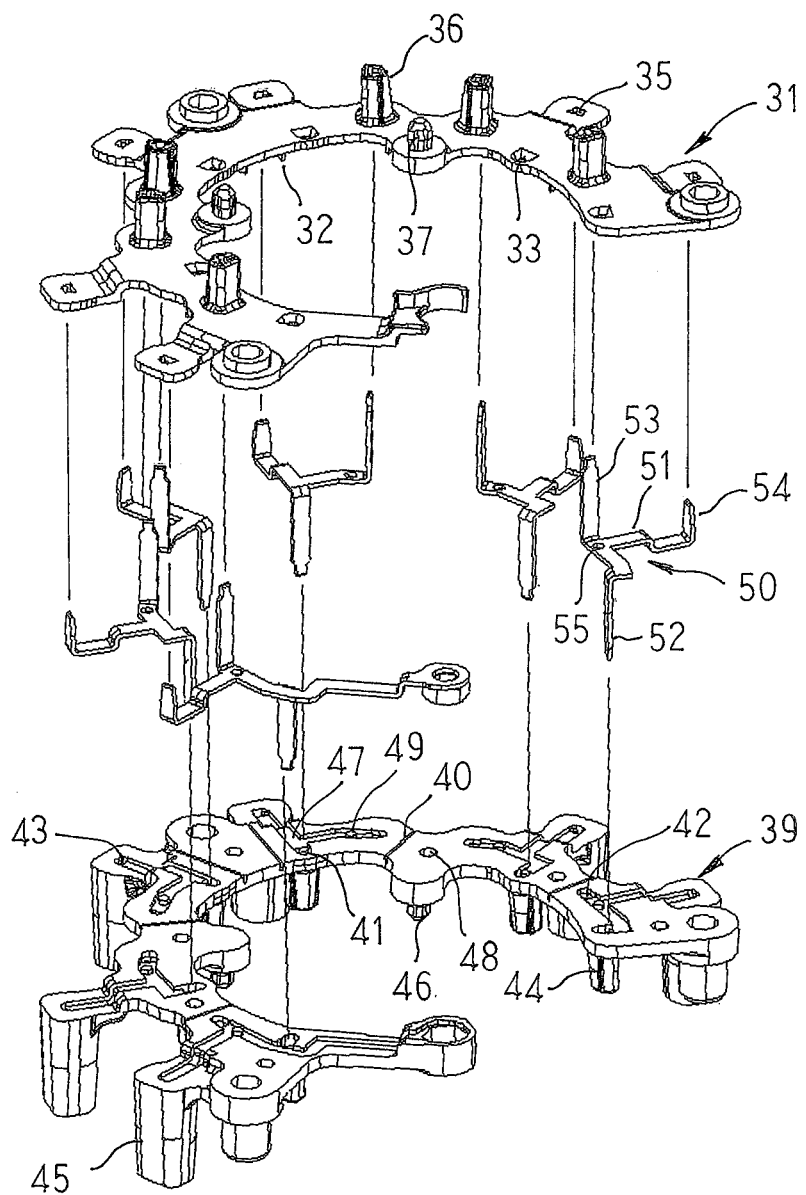
FIG. 9 is an exploded perspective that shows the circuit board that constitutes the automotive alternator rectifying apparatus according to Embodiment 1 of the present invention.
Figure 10:
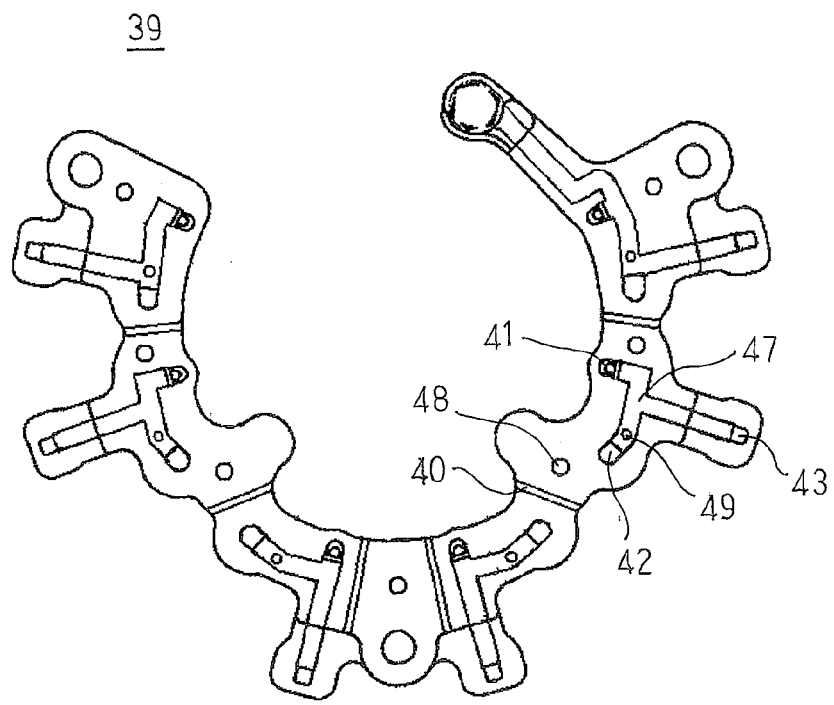
FIG. 10 is a front elevation that shows a second resin-molded body of the circuit board that constitutes the automotive alternator rectifying apparatus according to Embodiment 1 of the present invention.
Figure 11:
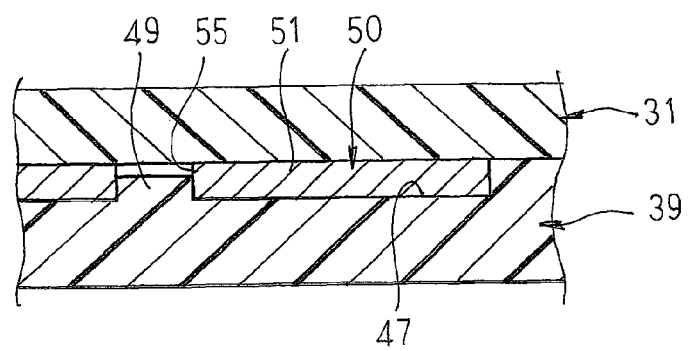
FIG. 11 is a cross section that is taken along Line XI-XI in FIG. 8 so as to be viewed in the direction of the arrows.
Figure 12:
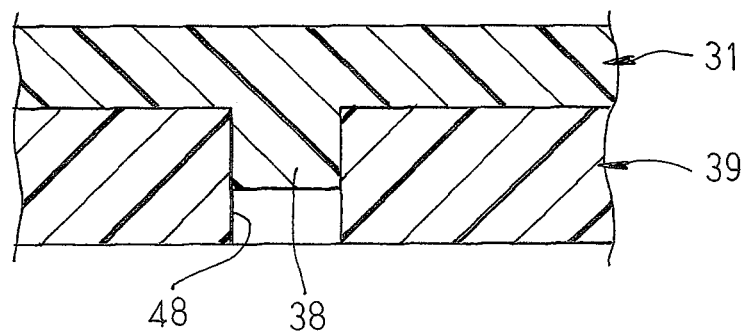
FIG. 12 is a cross section that is taken along Line XII-XII in FIG. 8 so as to be viewed in the direction of the arrows.
Figure 13:
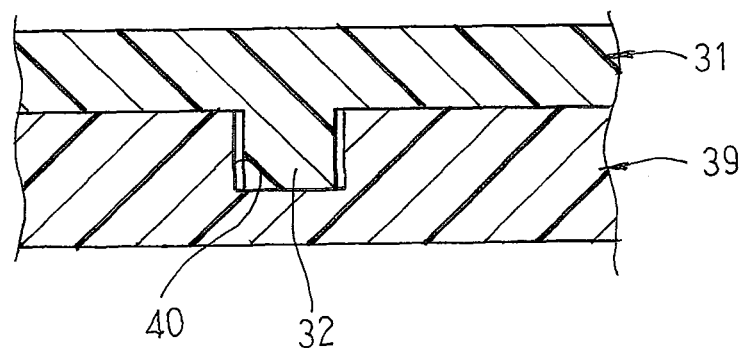
FIG. 13 is a cross section that is taken along Line XIII-XIII in FIG. 8 so as to be viewed in the direction of the arrows.

FIG. 1 is a longitudinal cross section that shows an automotive alternator according to Embodiment 1 of the present invention, FIG. 2 is a circuit configuration diagram for the automotive alternator according to Embodiment 1 of the present invention, FIG. 3 is a front elevation that shows an automotive alternator rectifying apparatus according to Embodiment 1 of the present invention, FIG. 4 is an exploded perspective that shows the automotive alternator rectifying apparatus according to Embodiment 1 of the present invention, FIG. 5 is a cross section that is taken along Line V-V in FIG. 3 so as to be viewed in the direction of the arrows, FIG. 6 is a cross section that is taken along Line VI-VI in FIG. 3 so as to be viewed in the direction of the arrows, FIG. 7 is a cross section that is taken along Line VII-VII in FIG. 3 so as to be viewed in the direction of the arrows, FIG. 8 is a front elevation that shows a circuit board that constitutes the automotive alternator rectifying apparatus according to Embodiment 1 of the present invention, FIG. 9 is an exploded perspective that shows the circuit board that constitutes the automotive alternator rectifying apparatus according to Embodiment 1 of the present invention, FIG. 10 is a front elevation that shows a second resin-molded body of the circuit board that constitutes the automotive alternator rectifying apparatus according to Embodiment 1 of the present invention, FIG. 11 is a cross section that is taken along Line XI-XI in FIG. 8 so as to be viewed in the direction of the arrows, FIG. 12 is a cross section that is taken along Line XII-XII in FIG. 8 so as to be viewed in the direction of the arrows, and FIG. 13 is a cross section that is taken along Line XIII-XIII in FIG. 8 so as to be viewed in the direction of the arrows.

In FIG. 1, an automotive alternator 1 includes: a casing 4 that is constituted by a front bracket 2 and a rear bracket 3 that are each approximately bowl-shaped and made of aluminum; a shaft 6 that is rotatably supported in the casing 4 by means of a pair of bearings 5; a pulley 7 that is fixed to an end portion of the shaft 6 that projects out frontward from the casing 4; a rotor 8 that is fixed to the shaft 6 and that is disposed inside the casing 4; fans 11 that are fixed to two end surfaces of the rotor 8 in an axial direction thereof; a stator 12 that is fixed to the casing 4 so as to surround the rotor 8; a pair of slip rings 15 that are fixed to a portion of the shaft 6 that projects out rearward from the casing 4, and that supply electric current to the rotor 8; a rectifying apparatus 20 that is formed into an approximate C shape, that is disposed outside the slip rings 15 in a fan shape that is centered around the shaft 6 in a plane that is perpendicular to the shaft 6, and that rectifies alternating-current voltages that are generated in the stator 12 into a direct-current voltage; a pair of brushes 17 that are housed inside a brush holder 16 that is disposed outside the pair of slip rings 15 between tip ends of the approximate C shape of the rectifying apparatus 20 so as to slide on the respective slip rings 15; a voltage regulator 18 that is mounted to the brush holder 16 and that adjusts magnitude of the alternating-current voltages that are generated in the stator 12; and a protective cover 19 that is mounted to the rear bracket 3 so as to cover the rectifying apparatus 20, the brush holder 16, and the voltage regulator 18.

The rotor 8 is a Lundell rotor, and includes: a field winding 9 that generates magnetic flux on passage of an excitation current; and a pole core 10 that is disposed so as to cover the field winding 9, and in which magnetic poles are formed by the magnetic flux. The stator 12 includes: a cylindrical stator core 13; and a stator winding 14 that is mounted into the stator core 13, and in which an alternating current arises due to changes in the magnetic flux from the field winding 9 that accompany rotation of the rotor 8, and is disposed such that the stator core 13 is held by the front bracket 2 and the rear bracket 3 from two axial ends so as to surround the rotor 8. The stator winding 14 is constituted by two wye-connected three-phase alternating-current windings.

Next, configuration of the rectifying apparatus 20 will be explained with reference to FIGS. 3 through 13.

As shown in FIGS. 3 and 4, the rectifying apparatus 20 has: a positive-side heatsink 21 to which six positive-side rectifying elements 24 are mounted; a negative-side heatsink 25 to which six negative-side rectifying elements 28 are mounted; and a circuit board 30 that connects the positive-side rectifying elements 24 and the negative-side rectifying elements 28 so as to configure bridge circuits.

The positive-side heatsink 21 is formed of aluminum, for example, into an approximate C shape, as shown in FIGS. 3 and 6. Six rectifying element interfitting apertures 22 are formed on the positive-side heatsink 21 so as to be spaced apart circumferentially, and such that each passes through in a thickness direction. Two circuit board holding apertures 23 are also formed on the positive-side heatsink 21 so as to be spaced apart circumferentially, and such that each passes through in a thickness direction.

As shown in FIG. 5, the positive-side rectifying elements 24 are configured by sealing in a resin a semiconductor element that has been formed into a p-n junction, for example, and have: a lead 24a that is connected to an anode; and a cylindrical copper base 24b that is connected to a cathode. The positive-side rectifying elements 24 are mounted to the positive-side heatsink 21 by press-fitting the bases 24b into the respective rectifying element interfitting apertures 22 such that the leads 24a extend outward on a rear surface side. Serrations are formed on outer circumferential surfaces of the bases 24b, ensuring sufficient engaging strength and electrical connection.

The negative-side heatsink 25 is formed of aluminum, for example, into an approximate C shape, as shown in FIG. 4. Six rectifying element interfitting apertures 26 are formed on the negative-side heatsink 25 so as to be spaced apart circumferentially, and such that each passes through in a thickness direction. Two circuit board holding apertures 27 are also formed on the negative-side heatsink 25 so as to be spaced apart circumferentially, and such that each passes through in a thickness direction.

As shown in FIG. 6, the negative-side rectifying elements 28 are configured by sealing in a resin a semiconductor element that has been formed into a p-n junction, for example, and have: a lead 28a that is connected to a cathode; and a cylindrical copper base 28b that is connected to an anode. The negative-side rectifying elements 28 are mounted to the negative-side heatsink 25 by press-fitting the bases 28b into the respective rectifying element interfitting apertures 26 such that the leads 28a extend outward on a front surface side. Serrations are formed on outer circumferential surfaces of the bases 28b, ensuring sufficient engaging strength and electrical connection.

As shown in FIGS. 8 through 10, the circuit board 30 has: first and second resin-molded bodies 31 and 39 that are molded into approximate C shapes by using an electrically insulating resin such as polybutylene terephthalate (PBT), etc.; and six terminals 50 that are held between the first and second resin-molded bodies 31 and 39, and that connect the positive-side rectifying elements 24 and the negative-side rectifying elements 28 so as to configure bridge circuits.

Six labyrinth salient portions 32 are disposed so as to project from a rear surface (a mating surface) of the first resin-molded body 31 so as to divide the rear surface of the first resin-molded body 31 into seven regions circumferentially. One positive-side lead insertion aperture 33, one negative-side lead insertion aperture 34, and one output wire insertion aperture 35 are formed in each of six regions that do not include the circumferential center of the first resin-molded body 31 that is divided by the labyrinth salient portions 32 so as to be separated from each other and so as to pass through the first resin-molded body 31 in a front-back direction. Tubular negative-side lead guide portions 36 are disposed so as to stand on the front surface side of the first resin-molded body 31 so as to correspond to the respective negative-side lead insertion apertures 34, and communicate with the rear surface side of the first resin-molded body 31 through the negative-side lead insertion apertures 34. Two interfitting salient portions 37 are disposed so as to project from the front surface of the first resin-molded body 31 so as to be separated in a circumferential direction. Seven coupling salient portions 38 are disposed so as to project from the rear surface of the first resin-molded body 31 so as to be separated in a circumferential direction.

Six labyrinth grooves 40 are recessed into a front surface (a mating surface) of the second resin-molded body 39 so as to divide the front surface of the second resin-molded body 39 into seven regions circumferentially. One positive-side lead insertion aperture 41, one negative-side lead insertion aperture 42, and one output wire insertion aperture 43 are formed in each of six regions that do not include the circumferential center of the second resin-molded body 39 that is divided by the labyrinth grooves 40 so as to be separated from each other and so as to pass through the second resin-molded body 39 in a front-back direction. Tubular positive-side lead guide portions 44 and output wire guide portions 45 are disposed so as to stand on the rear surface side of the second resin-molded body 39 so as to correspond to the respective positive-side lead insertion apertures 41 and output wire insertion apertures 43, and communicate with the front surface side of the second resin-molded body 39 through the positive-side lead insertion apertures 41 and the output wire insertion apertures 43. Two interfitting salient portions 46 are disposed so as to project from the rear surface of the second resin-molded body 39 so as to be separated in a circumferential direction. Terminal housing grooves 47 are recessed into the front surface in each of the six regions that do not include the circumferential center of the first resin-molded body 31 that is divided by the labyrinth salient portions 32 so as to link the positive-side lead insertion apertures 41, the negative-side lead insertion apertures 42, and the output wire insertion apertures 43. Seven coupling recess portions 48 are formed in the second resin-molded body 39 so as to pass through from front to rear so as to be separated in a circumferential direction. One positioning pin 49 is disposed so as to stand in each of the terminal housing grooves 47.

Here, the first resin-molded body 31 and the second resin-molded body 39 are formed such that when the rear surface of the first resin-molded body 31 and the front surface of the second resin-molded body 39 are stacked together the positive-side lead insertion apertures 33, the negative-side lead insertion apertures 34, and the output wire insertion apertures 35 of the first resin-molded body 31 face the positive-side lead insertion apertures 41, the negative-side lead insertion apertures 42, and the output wire insertion apertures 43 of the second resin-molded body 39, the coupling salient portions 38 of the first resin-molded body 31 face the coupling recess portions 48 of the second resin-molded body 39, the labyrinth salient portions 32 face the labyrinth grooves 40, and the interfitting salient portions 37 and 46 of the first resin-molded body 31 and the second resin-molded body 39 are coaxial. Moreover, the labyrinth salient portions 32 and the labyrinth grooves 40 fit together to constitute a labyrinth seal that functions as an electrical insulation ensuring means.

The terminals 50 are formed by press-molding a copper sheet, for example, and have: a trunk portion 51 that is housed in the terminal housing grooves 47; a positive electrode terminal portion 52 that is bent at a right angle from the trunk portion 51 and that is inserted from a positive-side lead insertion aperture 41 of the second resin-molded body 39 through a positive-side lead guide portion 44; a negative electrode terminal portion 53 that is bent at a right angle from the trunk portion 51 in an opposite direction to the positive electrode terminal portion 52 and that is inserted from a negative-side lead insertion aperture 34 of the first resin-molded body 31 through a negative-side lead guide portion 36; an output wire terminal portion 54 that is bent at a right angle from the trunk portion 51 in a similar direction to the negative electrode terminal portion 53 and that is inserted through an output wire insertion aperture 35 of the first resin-molded body 31; and a positioning aperture 55 that is formed so as to pass through the trunk portion 51, and into which a positioning pin 49 can be press-fitted.

To assemble a circuit board 30 that is configured in this manner, the terminals 50 are first disposed in the respective terminal housing grooves 47 by housing the trunk portions 51 in the terminal housing grooves 47 while inserting the positive electrode terminal portions 52 through the positive-side lead insertion apertures 41 into the positive-side lead guide portions 44, and press-fitting the positioning pins into the positioning apertures 55. Next, the rear surface of the first resin-molded body 31 is oriented toward the front surface of the second resin-molded body 39, the first resin-molded body 31 is stacked on the second resin-molded body 39, and the first resin-molded body 31 is pressed against the second resin-molded body 39. Thus, the negative electrode terminal portions 53 are inserted through the negative-side lead insertion apertures 34 into the negative-side lead guide portions 36, the output wire terminal portions 54 are inserted into the output wire insertion apertures 35, and the coupling salient portions 38 are press fitted into the coupling recess portions 48 to assemble the circuit board 30 that is shown in FIGS. 4 and 8.

Here, as shown in FIG. 11, the trunk portions 51 of the terminals 50 are positioned, fixed, and housed in the terminal housing grooves 47 by press-fitting the positioning pins 49 into the positioning apertures 55. As shown in FIG. 12, the first resin-molded body 31 and the second resin-molded body 39 are positioned, fixed, and integrated by press-fitting the coupling salient portions 38 into the coupling recess portions 48. In addition, as shown in FIG. 13, the circumferentially adjacent terminals 50 are separated from each other by a labyrinth seal by fitting the labyrinth salient portions 32 into the labyrinth grooves 40.

Next, a method for assembling the rectifying apparatus 20 will be explained.

First, the circuit board 30 is disposed between a rear surface of the positive-side heatsink 21 to which the positive-side rectifying elements 24 have been mounted and a front surface of the negative-side heatsink 25 to which the negative-side rectifying elements 28 have been mounted. Then, as shown in FIG. 7, the interfitting salient portions 37 and 46 are press-fitted into the circuit board holding apertures 23 and 27 of the positive-side and negative-side heat sinks 21 and 25. The positive-side heatsink 21, the circuit board 30, and the negative-side heatsink 25 are thereby laminated and integrated by the engaging force of the interfitting salient portions 37 and 46 in the circuit board holding apertures 23 and 27.

Here, as shown in FIG. 5, the leads 24a of the positive-side rectifying elements 24 pass from the front surface side of the circuit board 30 through the positive-side lead insertion apertures 33 and 41 and enter the positive-side lead guide portions 44, and tip ends thereof contact the positive electrode terminal portions 52. As shown in FIG. 6, the leads 28a of the negative-side rectifying elements 28 pass from the rear surface side of the circuit board 30 through the negative-side lead insertion apertures 42 and 34 and enter the negative-side lead guide portions 36, and tip ends thereof contact the negative electrode terminal portions 53. The rectifying apparatus 20 is then assembled by TIG-welding the leads 24a and the positive electrode terminal portions 52, and the leads 28a and the negative electrode terminal portions 53. As shown in FIG. 2, this rectifying apparatus 20 is configured into two three-phase diode bridges that are formed by arranging in parallel three rectifying element pairs that have been configured by connecting the positive-side rectifying elements 24 and the negative-side rectifying elements 28 in series.

A rectifying apparatus 20 that has been assembled in this manner is mounted to the automotive alternator 1 by orienting the negative-side heatsink 25 toward the rear bracket 3, and fastening to an outer end surface of the rear bracket 3 a mounting bolt (not shown) that is inserted through the positive-side heatsink 21, the circuit board 30, and the negative-side heatsink 25. The positive-side heatsink 21, the circuit board 30 and the negative-side heatsink 25 are integrated firmly by the fastening force from this mounting bolt, and the negative-side heatsink 25 is electrically connected to the rear bracket 3. Moreover, electrical insulation is ensured between the positive-side heatsink 21 and the mounting bolt.

Moreover, although not shown, output terminal bolts are mounted to the positive-side heatsink 21, are electrically connected to the cathodes of each of the positive-side rectifying elements 24 through the positive-side heatsink 21, and constitute output terminals of the rectifying apparatus 20. The anodes of each of the negative-side rectifying elements 28 are grounded through the negative-side heatsink 25 and the rear bracket 3.

In addition, the output wires 14a of the stator winding 14 pass through the output wire guide portions 45 and the output wire insertion apertures 43 and 35, are led out to a front surface side of the circuit board 30, and tip ends thereof contact the output wire terminal portions 54. The output wires 14a and the output wire terminal portions 54 are TIG-welded. Respective connecting points between the positive-side rectifying elements 24 and the negative-side rectifying elements 28 of the three-phase diode bridges are thereby connected to end portions of the phase windings of the respective three-phase alternating-current windings of the stator winding 14 through the terminals 50, as shown in FIG. 2. In addition, the field winding 9 is connected to the voltage regulator 18 through the slip rings 15 and the brushes 17.

Next, operation of an automotive alternator 1 that has been configured in this manner will be explained.

First, electric current is supplied to the field winding 9 of the rotor 8 by means of the brushes 17 and the slip rings 15, generating magnetic flux. North-seeking (N) poles and South-seeking (S) poles are formed alternately in a circumferential direction on outer circumferential portions of the pole core 10 by this magnetic flux.

At the same time, rotational torque from an engine (not shown) is transferred to the shaft 6 by means of a belt (not shown) and the pulley 7, rotating the rotor 8. Thus, rotating magnetic fields are applied to the stator winding 14 in the stator 12, generating electromotive forces in the stator winding 14. Alternating currents by these alternating-current electromotive forces are rectified into direct current by the rectifying apparatus 20, and supplied to on-board loads, and to a battery, etc. The on-board loads are thereby driven, and the battery is charged.

According to Embodiment 1, a circuit board 30 is configured such that terminals 50 are held from opposite sides by first and second resin-molded bodies 31 and 39. Thus, when the first and second resin-molded bodies 31 and 39 are being molded, it is not necessary to set the terminals 50 in the mold so as to be positioned at predetermined positions while ensuring desired postures, and mold sealing positions are also reduced. Moldability of the first and second resin-molded bodies 31 and 39 is thereby improved significantly, and yield is also increased, enabling costs to be reduced.

Because circumferentially adjacent terminals 50 are separated from each other by a labyrinth seal that results from the labyrinth salient portions 32 and the labyrinth grooves 40 fitting together, occurrences of electrical short-circuiting among the terminals 50 can be suppressed even if foreign matter such as water, etc., enters between the mating surfaces of the first and second resin-molded bodies 31 and 39.

Because terminal housing grooves 47 that house trunk portions 51 of the terminals 50 are recessed into the front surface of the second resin-molded body 39, setting of the terminals 50 is facilitated, improving assembly of the circuit board 30. In addition, because the positioning pins 49 are disposed so as to stand in the terminal housing grooves 47 and positioning apertures 55 that can be fitted together with the positioning pins 49 are formed on the trunk portions 51, the terminals 50 are positioned by housing the trunk portions 51 in the terminal housing grooves 47, and tilting of the terminals 50 is also prevented, further improving assembly of the circuit board 30.

Because a plurality of coupling salient portions 38 are disposed so as to stand on a rear surface of the first resin-molded body 31, and coupling recess portions 48 that can be fitted together with the respective coupling salient portions 38 are recessed into a front surface of the second resin-molded body 39, the first and second resin-molded bodies 31 and 39 can be assembled in a positioned state by fitting the coupling salient portions 38 together with the coupling recess portions 48, improving assembly of the circuit board 30. Because the first and second resin-molded bodies 31 and 39 are also integrated by the engaging force between the coupling recess portions 48 and the coupling salient portions 38, handling of the circuit board 30 is facilitated, improving assembly of the rectifying apparatus 20.

Moreover, in Embodiment 1 above, terminal housing grooves are formed on a front surface of a second resin-molded body, but terminal housing grooves may also be formed on a rear surface of a first resin-molded body, or may also be formed on both the rear surface of the first resin-molded body and the front surface of the second resin-molded body.

In Embodiment 1 above, positioning pins are formed in terminal housing grooves, and positioning apertures are formed on trunk portions of terminals, but positioning apertures may also be formed in the terminal housing grooves, and positioning pins formed on the trunk portions of the terminals.

In Embodiment 1 above, the labyrinth salient portions and the labyrinth grooves are formed singly, but the number of labyrinth salient portions and labyrinth grooves may also be increased, and gaps between recesses and protrusions formed in multiple steps.

In Embodiment 1 above, labyrinth salient portions are formed on a rear surface of a first resin-molded body, and labyrinth grooves are formed on a front surface of a second resin-molded body, but labyrinth salient portions may also be formed on a front surface of a second resin-molded body, and labyrinth grooves formed by a rear surface of a first resin-molded body.

In Embodiment 1 above, coupling salient portions are disposed so as to stand on a rear surface of a first resin-molded body, and coupling recess portions are recessed into a front surface of a second resin-molded body, but coupling recess portions may also be recessed into a rear surface of a first resin-molded body, and coupling salient portions disposed so as to stand on a front surface of a second resin-molded body.

Embodiment 2

Figure 14:
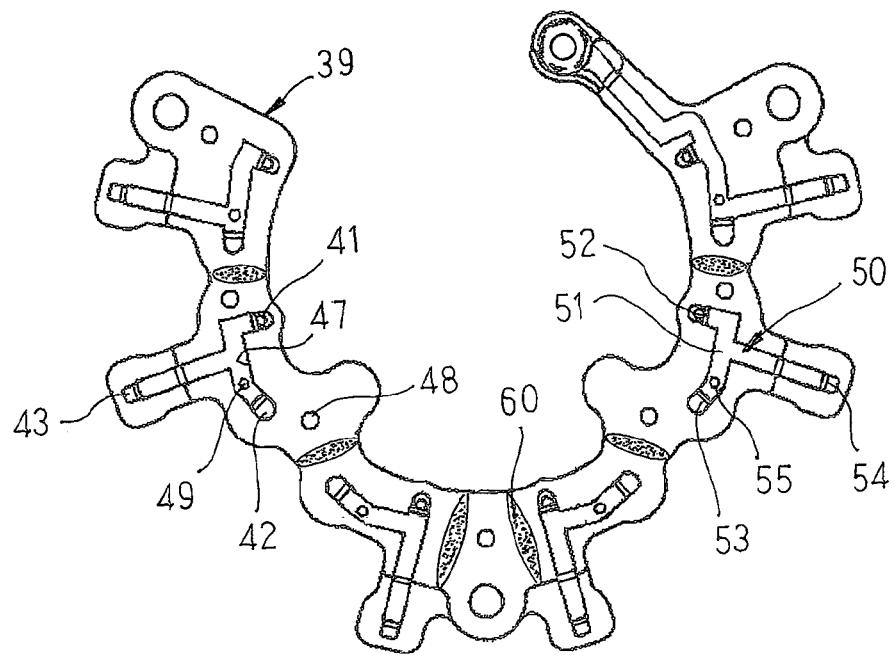
FIG. 14 is a front elevation that shows a second resin-molded body of a circuit board that constitutes an automotive alternator rectifying apparatus according to Embodiment 2 of the present invention.

FIG. 14 is a front elevation that shows a second resin-molded body of a circuit board that constitutes an automotive alternator rectifying apparatus according to Embodiment 2 of the present invention.

In Embodiment 2, circumferentially adjacent terminals are separated from each other by electrically insulating resin layers that function as an electrical insulation ensuring means instead of a labyrinth seal between labyrinth salient portions and labyrinth grooves. Specifically, as shown in FIG. 14, terminals 50 are disposed on a second resin-molded body 39 such that trunk portions 51 are housed inside terminal housing grooves 47, and then a liquid electrically insulating resin 60 is applied to a front surface of the second resin-molded body 39 such that the front surface of the second resin-molded body 39 is divided into seven regions circumferentially. A circuit board is assembled by stacking together and integrating a first resin-molded body 31 and the second resin-molded body 39. The electrically insulating resin 60 that is interposed between mating surfaces between the first resin-molded body 31 and the second resin-molded body 39 cures to constitute electrically insulating resin layers that separate the trunk portions 51 of the circumferentially adjacent terminals 50 from each other.

According to Embodiment 2, because circumferentially adjacent terminals 50 are separated from each other by electrically insulating resin layers that are formed by curing an electrically insulating resin 60, occurrences of electrical short-circuiting among the terminals 50 can be suppressed even if foreign matter such as water, etc., enters between the mating surfaces of the first and second resin-molded bodies 31 and 39.

Embodiment 3

Figure 15:
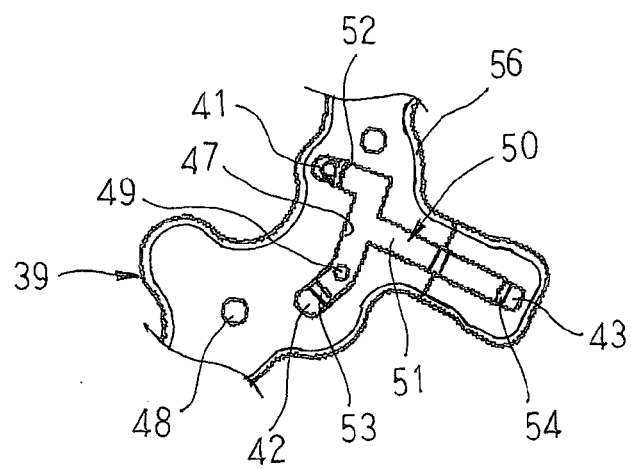
FIG. 15 is a front elevation that shows part of a second resin-molded body of a circuit board that constitutes an automotive alternator rectifying apparatus according to Embodiment 3 of the present invention.
Figure 16:
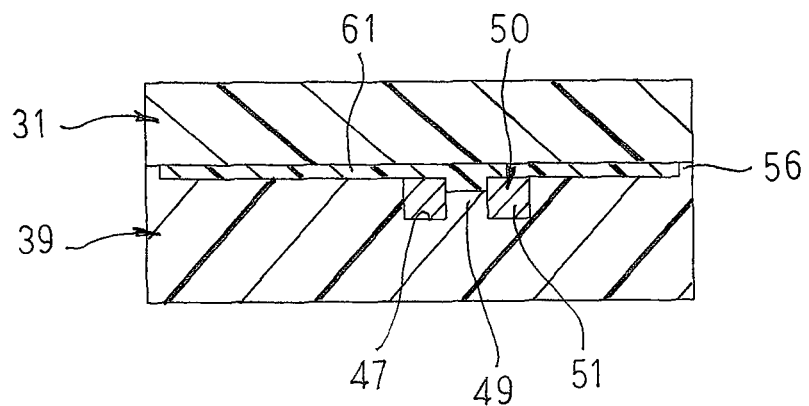
FIG. 16 is a cross section that shows part of the circuit board that constitutes the automotive alternator rectifying apparatus according to Embodiment 3 of the present invention.

FIG. 15 is a front elevation that shows part of a second resin-molded body of a circuit board that constitutes an automotive alternator rectifying apparatus according to Embodiment 3 of the present invention, and FIG. 16 is a cross section that shows part of the circuit board that constitutes the automotive alternator rectifying apparatus according to Embodiment 3 of the present invention.

In Embodiment 3, as shown in FIG. 15, a peripheral wall 56 is disposed so as to stand on an outer peripheral edge portion of a front surface of a second resin-molded body 39 around an entire circumference. Thus, as shown in FIG. 16, a gap is formed by the peripheral wall 56 between mating surfaces between a first resin-molded body 31 and the second resin-molded body 39 that have been stacked together and integrated, and an electrically insulating resin layer 61 is configured by filling the gap in question through an injection port (not shown) with a liquid electrically insulating resin that is cured therein.

According to Embodiment 3, because approximately all regions between mating surfaces between first resin-molded body 31 and second resin-molded body 39 are filled with an electrically insulating resin layer 61, foreign matter such as water, etc., will not enter between the mating surfaces of the first and second resin-molded bodies 31 and 39. Thus, circumferentially adjacent terminals 50 are reliably separated from each other, preventing occurrences of electrical short-circuiting among the terminals 50.

Moreover, in Embodiments 2 and 3 above, the electrically insulating resin layer that is interposed between the mating surfaces of the first and second resin-molded bodies need only have electrically insulating properties, and an epoxy resin, a silicone resin, etc., can be used, but from the viewpoint of the vibration resistance, it is preferable to use a silicone resin, or a urethane resin, etc., that becomes a rubbery elastic body after curing.

Embodiment 4

Figure 17:
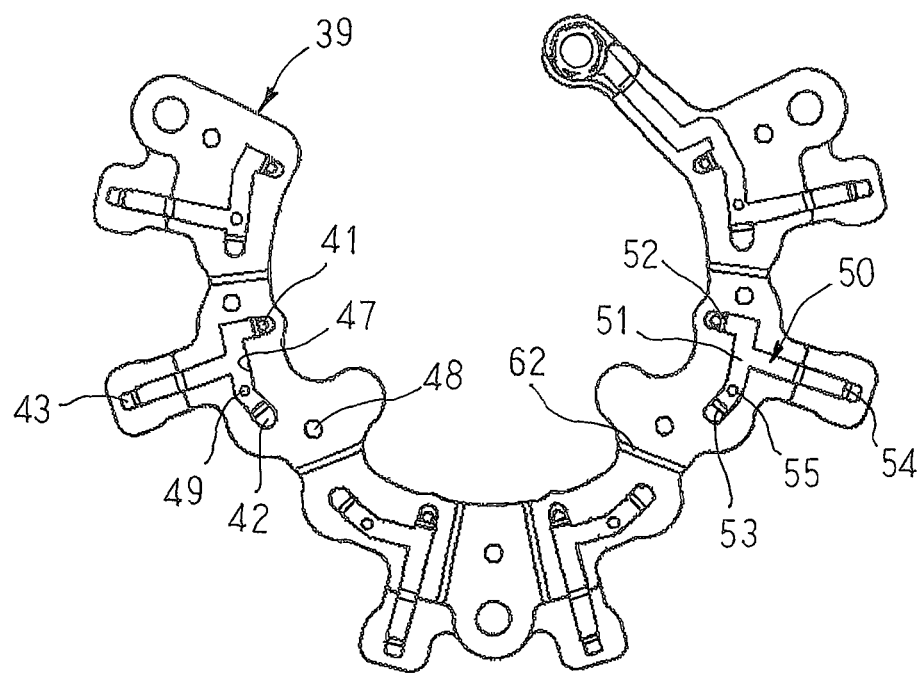
FIG. 17 is a front elevation that shows a second resin-molded body of a circuit board that constitutes an automotive alternator rectifying apparatus according to Embodiment 4 of the present invention.

FIG. 17 is a front elevation that shows a second resin-molded body of a circuit board that constitutes an automotive alternator rectifying apparatus according to Embodiment 4 of the present invention.

In Embodiment 4, circumferentially adjacent terminals are separated from each other using first rubbery elastic members 62 that function as an electrical insulation ensuring means instead of a labyrinth seal between labyrinth salient portions and labyrinth grooves. The first rubbery elastic members 62 is formed into a rod shape by using an electrically insulating synthetic rubber such as a silicone rubber, or a urethane rubber, etc. As shown in FIG. 17, terminals 50 are disposed on a second resin-molded body 39 such that trunk portions 51 are housed inside terminal housing grooves 47, and then the rod-shaped first rubbery elastic members are disposed such that the front surface of the second resin-molded body 39 is divided into seven regions circumferentially. A circuit board is assembled by stacking together and integrating a first resin-molded body 31 (not shown) and the second resin-molded body 39.

According to Embodiment 4, because the first rubbery elastic members 62 are pressed and held between the mating surfaces of the first and second resin-molded bodies 31 and 39 and elastically deformed, and separate circumferentially adjacent terminals 50 from each other, occurrences of electrical short-circuiting among the terminals 50 can be suppressed even if foreign matter such as water, etc., enters between the mating surfaces of the first and second resin-molded bodies 31 and 39.

Moreover, in Embodiment 4, first rubbery elastic members are disposed on a front surface of a second resin-molded body, but first rubbery elastic members may also be made by applying a liquid silicone resin, etc., to the front surface of the second resin-molded body and curing it thereon, for example, and then a first resin-molded body and the second resin-molded body may be stacked together and integrated.

Embodiment 5

Figure 18:
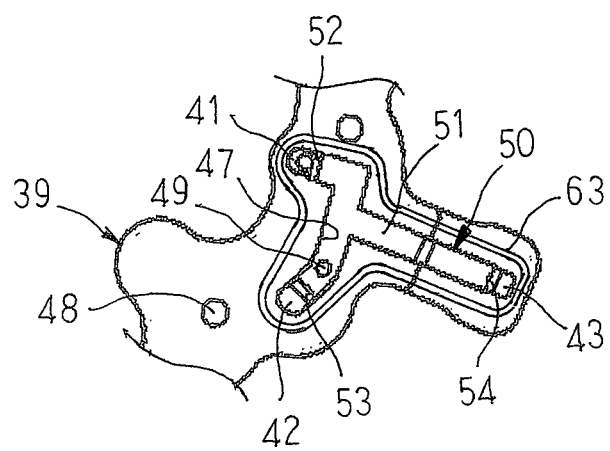
FIG. 18 is a front elevation that shows part of a second resin-molded body of a circuit board that constitutes an automotive alternator rectifying apparatus according to Embodiment 5 of the present invention.

FIG. 18 is a front elevation that shows part of a second resin-molded body of a circuit board that constitutes an automotive alternator rectifying apparatus according to Embodiment 5 of the present invention.

In FIG. 18, first rubbery elastic members 63 that function as an electrical insulation ensuring means are formed into ring shapes by using an electrically insulating synthetic rubber such as a silicone rubber, or a urethane rubber, etc., and are disposed so as to surround terminal housing grooves 47 on a front surface of a second resin-molded body 39.

In Embodiment 5, a circuit board is assembled by stacking together and integrating a first resin-molded body 31 (not shown) and the second resin-molded body 39 on which the first rubbery elastic members 63 have been disposed. Thus, because the first rubbery elastic members 63 are pressed and held between the mating surfaces of the first and second resin-molded bodies 31 and 39 and surround the terminal housing grooves 47 in an elastically deformed state, circumferentially adjacent terminals 50 can be separated from each other more reliably, enabling occurrences of electrical short-circuiting among the terminals 50 to be suppressed more reliably.

Embodiment 6

Figure 19:
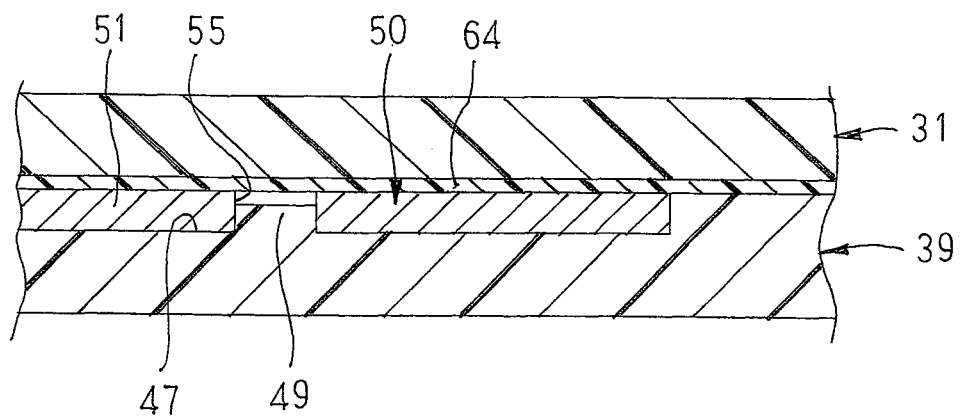
FIG. 19 is a cross section that shows part of a circuit board that constitutes an automotive alternator rectifying apparatus according to Embodiment 6 of the present invention.

FIG. 19 is a cross section that shows part of a circuit board that constitutes an automotive alternator rectifying apparatus according to Embodiment 6 of the present invention.

In FIG. 19, a first rubbery elastic member 64 that functions as an electrical insulation ensuring means is formed into a sheet shape by using a synthetic rubber such as a silicone rubber, or a urethane rubber, etc., is disposed on approximately all surfaces between mating surfaces of first and second resin-molded bodies 31 and 39, and is pressed and held between the mating surfaces of the first and second resin-molded bodies 39. Moreover, although not shown, apertures are formed on portions of the first rubbery elastic member 64 that correspond to coupling portions between coupling salient portions 38 and coupling recess portions 48, positive-side lead insertion apertures 41, negative-side lead insertion apertures 42, and output wire insertion apertures 43.

In Embodiment 6, because the sheet-shaped first rubbery elastic member 64 is pressed and held between the mating surfaces of the first and second resin-molded bodies 31 and 39 and is interposed between the first and second resin-molded bodies 31 and 39 in an elastically deformed state, circumferentially adjacent terminals 50 can be separated from each other more reliably, enabling occurrences of electrical short-circuiting among the terminals 50 to be suppressed more reliably.

Moreover, in Embodiment 6 above, the sheet-shaped first rubbery elastic member is formed into have a shape that covers approximately all surfaces between mating surfaces of first and second resin-molded bodies, and apertures are formed at portions that correspond to coupling portions between coupling salient portions and coupling recess portions, positive-side insertion apertures, negative-side insertion apertures, and output wire insertion apertures, but apertures that surround terminal housing grooves may also be additionally formed on the first rubbery elastic member.

Embodiment 7

Figure 20:
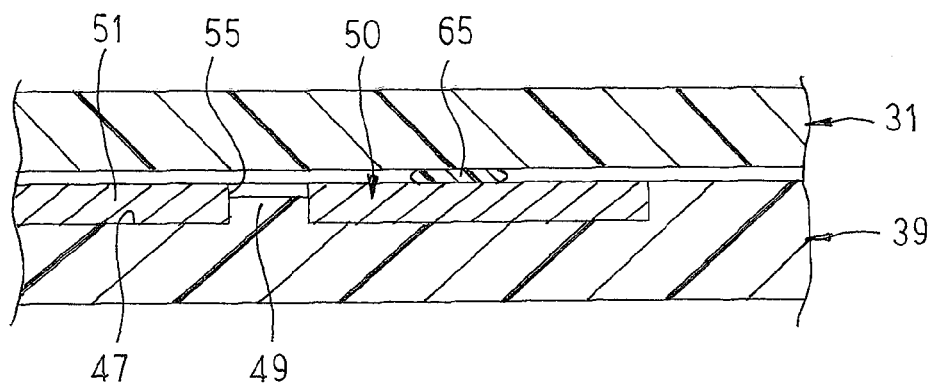
FIG. 20 is a cross section that shows part of a circuit board that constitutes an automotive alternator rectifying apparatus according to Embodiment 7 of the present invention.

FIG. 20 is a cross section that shows part of a circuit board that constitutes an automotive alternator rectifying apparatus according to Embodiment 7 of the present invention.

In Embodiment 7, as shown in FIG. 20, second rubbery elastic members 65 that are formed using a silicone rubber, or a urethane rubber, etc., are disposed on front surfaces of respective trunk portions 51. A circuit board is assembled by stacking together and integrating a first resin-molded body 31 and the second resin-molded body 39.

According to Embodiment 7, because the second rubbery elastic members 65 are held under pressure between the trunk portions 51 and a rear surface of a first resin-molded body 31, and are elastically deformed, the second rubbery elastic members 65 function as dampers, absorbing vibrations that are transmitted to the circuit board from a vehicle, thereby enabling vibration resistance of the rectifying apparatus to be increased.

Here, in Embodiment 7, second rubbery elastic members are disposed on front surfaces of trunk portions, but second rubbery elastic members may also be made by applying a liquid silicone resin, etc., to the front surfaces of the trunk portions and curing it thereon, for example, and then a first resin-molded body and the second resin-molded body may be stacked together and integrated.

It is preferable to dispose the second rubbery elastic members on the trunk portions so as to be in close proximity to positive electrode terminal portions, negative electrode terminal portions, and output wire terminal portions, which vibrate easily.

Embodiment 8

Figure 21:
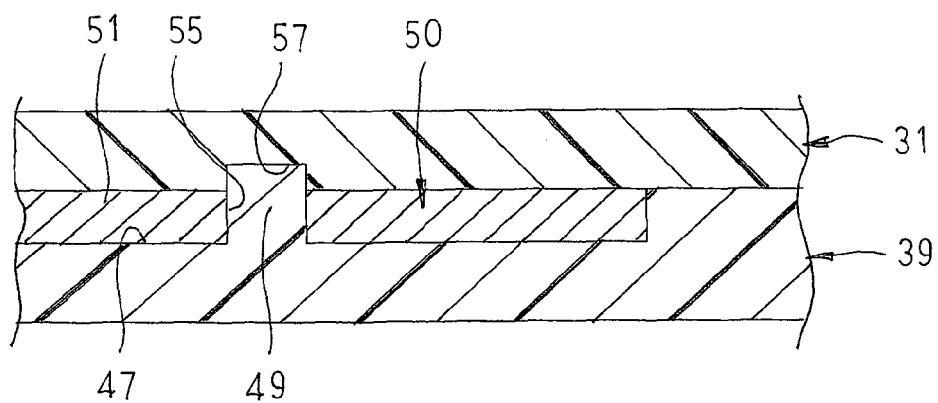
FIG. 21 is a cross section that shows part of a circuit board that constitutes an automotive alternator rectifying apparatus according to Embodiment 8 of the present invention.

FIG. 21 is a cross section that shows part of a circuit board that constitutes an automotive alternator rectifying apparatus according to Embodiment 8 of the present invention.

In FIG. 21, positioning pins 49 are disposed so as to stand in terminal housing grooves 47 so as to extend outward from the terminal housing grooves 47. Coupling recess portions 57 are recessed into a rear surface of a first resin-molded body 31 so as to face the positioning pins 49. When the first resin-molded body 31 and a second resin-molded body 39 are being stacked together, the first resin-molded body 31 and the second resin-molded body 39 are integrated by press-fitting the positioning pins 49 into the coupling recess portions 57.

According to Embodiment 8, because the first resin-molded body 31 and the second resin-molded body 39 are positioned and integrated by engaging forces between the positioning pins 49 and the coupling recess portions 57, coupling salient portions 38 are no longer required, facilitating preparation of the second resin-molded body 39.

Moreover, in each of the above embodiments, a brush holder, a voltage regulator, and a rectifying apparatus are disposed axially outside a rear bracket, but these parts may also be disposed inside a rear bracket so as to face a rotor, for example. In that case, the second heatsink is fastened to an inner wall surface of the rear bracket, output wire guide portions are disposed so as to stand on a front surface of a first resin-molded body, and output wire terminal portions of terminals are extended outward to a rear surface side of the second resin-molded body.

In each of the above embodiments, a brush holder, a voltage regulator, and a rectifying apparatus are disposed at a rear bracket end, but these parts may also be disposed at a front bracket end.

In each of the above embodiments, six positive-side and six negative-side rectifying elements are mounted to the positive-side and negative-side heat sinks, but the numbers of positive-side and negative-side rectifying elements are not limited to six, and if the stator winding is constituted by a single set of three-phase alternating-current windings, for example, three positive-side and three negative-side heat sinks should be mounted to positive-side and negative-side rectifying elements, and there should be three circuit board terminals.

In each of the above embodiments, positive-side and negative-side heat sinks are each constituted by single approximately C-shaped heatsink bodies, but the positive-side and negative-side heat sinks may also be configured by arranging a plurality of the heatsink bodies into an approximate C shape.

In each of the above embodiments, positive-side and negative-side heat sinks that have no radiating fins have been used, but it goes without saying that positive-side and negative-side heat sinks that have radiating fins may also be used.

In each of the above embodiments, a rectifying apparatus that is configured by stacking a positive-side heatsink, a circuit board, and a negative-side heatsink is fastened to a rear bracket, but order of axial arrangement of these parts is not limited to the order of the positive-side heatsink, the circuit board, the negative-side heatsink, and the rear bracket. For example, an order of a negative-side heatsink, a circuit board, a positive-side heatsink, and the rear bracket, an order of a positive-side heatsink, a negative-side heatsink, a circuit board, and a rear bracket, an order of a negative-side heatsink, a positive-side heatsink, a circuit board, and a rear bracket, an order of a circuit board, a positive-side heatsink, a negative-side heatsink, and a rear bracket, or an order of a circuit board, a negative-side heatsink, a positive-side heatsink, and a rear bracket is also acceptable. Positive-side lead guide portions, negative-side lead guide portions, and stator lead guide portions must be disposed so as to project from the first resin-molded body and the second resin-molded body of the circuit board so as to correspond to the above-mentioned order of axial arrangement. If the positive-side heatsink is disposed near the rear bracket, an electrically-insulating member must be interposed between the positive-side heatsink and the rear bracket.

What is claimed is:

1. An automotive alternator rectifying apparatus that rectifies alternating current by an alternating-current electromotive force that is generated in an automotive alternator stator into direct current, said rectifying apparatus comprising:
    a positive-side heatsink, and a plurality of positive-side rectifying elements mounted to said positive-side heatsink;
    a negative-side heatsink that is disposed so as to be separated from said positive-side heatsink, and a plurality of negative-side rectifying elements mounted to said negative-side heatsink; and
    a circuit board that is disposed so as to be stacked with said positive-side heatsink and said negative-side heatsink, and that connects said plurality of positive-side rectifying elements and said plurality of negative-side rectifying elements to configure a bridge circuit,
    wherein:
    said circuit board comprises:
        an electrically insulating first resin-molded body;
        an electrically insulating second resin-molded body that is stacked together with said first resin-molded body and integrated with said first resin-molded body; and
        a plurality of terminals each comprising:
            a positive electrode terminal portion, and a lead of at least one of said plurality of positive-side rectifying elements to be connected to said positive electrode terminal portion;
            a negative electrode terminal portion, and a lead of at least one of said plurality of negative-side rectifying elements to be connected to said negative electrode terminal portion; and
            a trunk portion that links said positive electrode terminal portion and said negative electrode terminal portion; and
    said plurality of terminals are each held between said first resin-molded body and said second resin-molded body so as to be separated from each other such that said trunk portion is disposed between mating surfaces of said first resin-molded body and said second resin-molded body, said positive electrode terminal portion is inserted through said second resin-molded body, and said negative electrode terminal portion is inserted through either said first resin-molded body or said second resin-molded body.

2. An automotive alternator rectifying apparatus according to claim 1, wherein an electrical insulation ensuring means that ensures electrical insulation between adjacent terminals of said plurality of terminals is configured between said mating surfaces of said first resin-molded body and said second resin-molded body.

3. An automotive alternator rectifying apparatus according to claim 2, wherein said electrical insulation ensuring means is a labyrinth seal that is constituted by recesses and protrusions that are formed on said mating surfaces of said first resin-molded body and said second resin-molded body so as to separate adjacent trunk portions from each other.

4. An automotive alternator rectifying apparatus according to claim 2, wherein said electrical insulation ensuring means is an electrically insulating resin layer that is interposed between said mating surfaces of said first resin-molded body and said second resin-molded body.

5. An automotive alternator rectifying apparatus according to claim 4, wherein said electrically insulating resin layer is configured by curing an electrically insulating resin that is formed between said mating surfaces of said first resin-molded body and said second resin-molded body so as to separate said adjacent trunk portions from each other.

6. An automotive alternator rectifying apparatus according to claim 4, wherein:
    a peripheral wall is disposed so as to project around an entire circumference from an outer peripheral edge portion of at least one of said mating surfaces of said first resin-molded body and said second resin-molded body; and
    said electrically insulating resin layer is configured by filling a gap that is formed between said mating surfaces of said first resin-molded body and said second resin-molded body by said peripheral wall with an electrically insulating resin that is cured therein.

7. An automotive alternator rectifying apparatus according to claim 2, wherein said electrical insulation ensuring means is a first rubbery elastic member that is disposed between said mating surfaces of said first resin-molded body and said second resin-molded body so as to separate said adjacent trunk portions from each other, and that is pressed and held between said first resin-molded body and said second resin-molded body.

8. An automotive alternator rectifying apparatus according to claim 7, wherein said first rubbery elastic member is formed into have a ring shape so as to surround said trunk portion.

9. An automotive alternator rectifying apparatus according to claim 7, wherein said first rubbery elastic member is formed into a sheet shape that is disposed on an entire surface between said mating surfaces of said first resin-molded body and said second resin-molded body.

10. An automotive alternator rectifying apparatus according to claim 9, wherein apertures that surround each of said trunk portions are formed on said first rubbery elastic member.

11. An automotive alternator rectifying apparatus according to claim 2, wherein a second rubbery elastic member is pressed and held between said trunk portion and at least one of said mating surfaces of said first resin-molded body and said second resin-molded body.

12. An automotive alternator rectifying apparatus according to claim 1, wherein:

a terminal housing groove is recessed into at least one of said mating surfaces of said first resin-molded body and said second resin-molded body; and said plurality of terminals are respectively held between said first resin-molded body and said second resin-molded body such that said trunk portions are housed in said terminal housing groove.

13. An automotive alternator rectifying apparatus according to claim 12, wherein a positioning aperture is formed on said trunk portion, a positioning pin is disposed so as to stand in said terminal housing groove, and said trunk portion is housed in said terminal housing groove by inserting said positioning pin into said positioning aperture.

14. An automotive alternator rectifying apparatus according to claim 13, wherein a coupling recess portion is recessed into a mating surface that faces said terminal housing groove, and said first resin-molded body and said second resin-molded body are integrated by press-fitting said positioning pin into said coupling recess portion.

* * * * *